Oct. 23, 1923.
A. MARQUIS
1,471,620
COMBINED BLOWPIPE AND SOLDERING IRON
Filed May 26, 1921
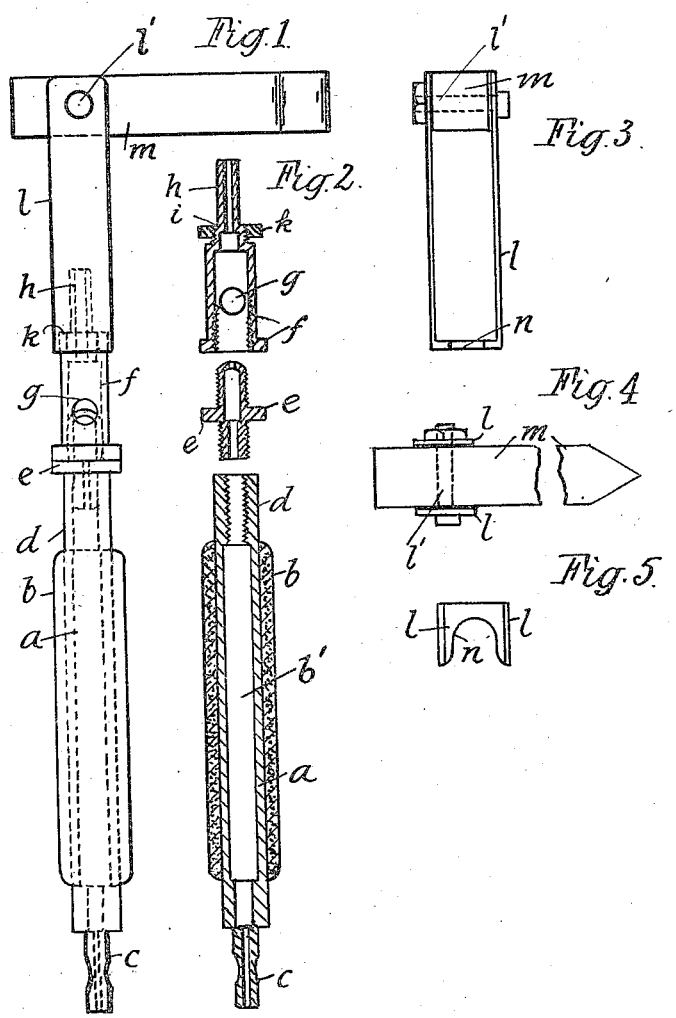

Patented Oct. 23, 1923.

1,471,620

UNITED STATES PATENT OFFICE.

AMÉDÉE MARQUIS, OF LONDON, ENGLAND.

COMBINED BLOWPIPE AND SOLDERING IRON.

Application filed May 26, 1921. Serial No. 472,893.

*To all whom it may concern:*

Be it known that I, AMÉDÉE MARQUIS, a citizen of the Swiss Confederation, residing at London, in the Kingdom of England, have invented new and useful Combined Blowpipes and Soldering Irons, of which the following is a specification.

My invention relates to a combined blowpipe and soldering iron its object being to provide a simple appliance with a removable U-shaped holder and inturning copper-bit which can readily serve for either purpose and will give a powerful flame while at the same time being easy to manufacture.

In order that the invention may be fully understood and readily carried into effect I will now proceed to describe the same with reference to the accompanying drawings, in which:

Figure 1 is an elevation showing the apparatus fitted with the soldering bit: Fig. 2 shows a vertical section with the individual parts slightly spaced apart and without the soldering attachment; Fig. 3 shows an end view of the soldering attachment. Fig. 4 shows a corresponding plan and Fig. 5 shows a plan of the holder for the bit.

According to the construction adopted as illustrated, I provide a central tube or hollow expansion tube $a$ partly surrounded by a non-conducting material $b$, fibre for example, so as to be capable of being held in the hand for use.

The inlet end to the expansion tube $a$ is contracted or reduced as at $c$ to receive a gas supply pipe or the like. The other end $d$ is slightly reduced and has screwed into it a flanged nipple $e$ over which is secured a nozzle $f$ having lateral air holes $g$ in its lower portion and being fitted with, or reduced at its upper extremity to form the burner $h$. The nipple $e$ and nozzle $f$ together form a combined supplementary expansion chamber and Bunsen tube, the parts being of such dimensions as to give the size of flame desired. A short screw-thread $i$ is formed on the burner $h$ of the nozzle $f$ to receive a nut $k$ for holding a removable slotted member $l$ carrying the soldering bit $m$, when such is needed.

This member is of U-shape having a cut-out seating portion $n$ in its base or bridge portion to enable it to be slipped around the screw-threads $i$ upon the annular seat of the nozzle $f$ and being locked in position by the aforesaid nut $k$. The upper ends or prongs of the U-member carry a copper bit $m$, on a cross-bolt, so that the bit can be turned inwards out of harm's way when not in use.

The hollow central member forms, a gas expansion chamber by reason of an inner enlarged portion $b^1$ with contracted ends and consequently a certain pressure of gas is thus forced through the nipple $e$, the area of which is calculated to suit the size of the apparatus, while a supplementary expansion chamber is formed by the nozzle $f$.

It will be obvious that a simple and effective appliance is provided by this invention which, when used as a soldering iron, provides constant heat from the flame direct onto the bit.

The top of the nipple $e$ must, in practice be exactly at the centre of the air holes $g$ in order to give the best results.

I claim:

In a combined blow pipe and soldering iron, a gas tube having a shouldered contracted rear end, an inner enlarged portion to form expansion chamber and an internally screw-threaded contracted forward end, a handle covering the expansion chamber, a flanged nipple screwed into said forward end, a laterally perforated nozzle secured on the nipple and forming supplementary air and gas mixing chamber, a straight burner tube screwed into the outer end of and leaving an annular seat on said nozzle, an U-shaped holding member, having a cut-out seating portion, carried on the seat of said nozzle, a nut on said burner tube to lock the holding member, and a copper-bit carried on a cross-bolt fast in the prongs of said holding member.

A. MARQUIS.